Jan. 4, 1955     J. M. HADLEY     2,698,598
AMUSEMENT AND EXERCISING DEVICE FOR ANIMALS
Filed July 21, 1952

INVENTOR.
JOHN M. HADLEY
BY *Terry A Cohn*
ATTORNEY.

United States Patent Office 2,698,598
Patented Jan. 4, 1955

2,698,598

AMUSEMENT AND EXERCISING DEVICE FOR ANIMALS

John M. Hadley, Clayton, Mo.

Application July 21, 1952, Serial No. 300,029

1 Claim. (Cl. 119—29)

This invention relates to improvements in amusement and exercising devices for animals, and more particularly, but without limitation, an exercising, development and amusement device for pet dogs, although the arrangement is applicable with or without minor changes, for similar usage in connection with cats and other domestic pets.

This applicant is aware that certain amusement and development devices have heretofore been devised for the muscular training and occupation of pets such as dogs. However, all of such devices which have come to applicant's attention, are short lived, easily destroyed or impaired after a short period of usage, and if including rubber or rubber-like materials, are subject to ageing and setting effects which require frequent replacement. It is accordingly a general objective of the present improvements to provide a permanent or semi-permanent device for the purpose noted, which is or may be formed entirely of materials which will resist long periods of active usage by the animal, and yet which is of improved adaptability to dogs and other pets of different sizes whether due to growth of the same animal or repeated usage by animals of different sizes and breeds.

More particularly described in reference to improved results, the arrangement to be described includes a lightly loaded coil-type tension spring of substantial length, together with an improved height-adjusting means for connecting the spring to a lure, and in a most advanced form, the utilization of a lure support or lure-gripping member which embodies adjusting means enabling the utilization of a great variety of objects as a source of attraction for the pet.

Yet another highly important object of the invention is realized in a highly elastic lure support and the pendular mounting thereof from a fixed bracket such as to enable a free swinging action of a pendular system including the lure, through quite a substantial angle with respect to, and in any direction from a vertical line through the point of pendular support.

Objectively the presently improved combination of features enables a wide selection of articles attractive to and designed to engage the interest and attention of a dog or other domestic pet, for examples, but without limitation, a bell, ball, rattle, a real or simulated bone, or a shoe may be selectively and yet positively secured to the lower end of the spring system, it having been found that different such lures are objects of optimum appeal to different individual domestic pets.

An additional and important object of the invention is realized in a device which, by providing an attractive pet amusement device, obviates the usual destruction, particularly by younger dogs, of valuable articles such as shoes, small articles of clothing and the like.

It is a further and important object of the invention to utilize an elongate spring or equivalent elastic support which, without excessively taxing a given dog or other animal, will yet provide effective competitive, combative and helpful recreative exercise and amusement when the pet grasps, strikes, bites or otherwise engages the lure.

The foregoing and numerous other objects will more clearly appear from the following detailed description of a presently preferred embodiment of the invention, particularly when considered in connection with the accompanying drawings, in which.

Figure 1:
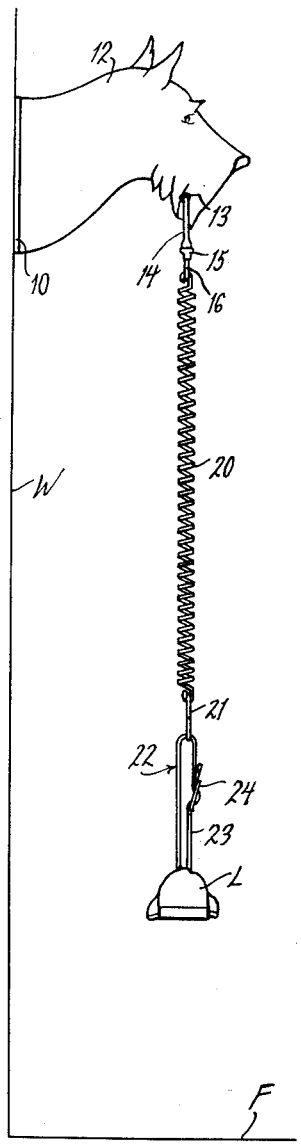
Fig. 1 is a side elevational view of the amusement and exercising device as same would appear in a position of use, but with the lure omitted for clearness.

Referring now by characters of reference to the drawing and first to Fig. 1 by way of outline of the major elements preferably employed, there is utilized a normally fixed supporting bracket for the purpose of locating the device in an area selected for the exercisce and amusement of the pet. This bracket includes, as best appears from Fig. 2, a mounting plate or flange indicated at 10 and provided with apertures 11 for the reception of wood screws or the like through which the bracket may be mounted at a selected height, say to a door frame, wall or like vertical structure. Shown at a right angle to the mounting flange 10 is a horizontally supported arm generally indicated at 12 and shown as simulating, in outline, a dog's head, although any other desired design may be utilized. The parts 10 and 12 of the bracket are preferably formed of a relatively heavy gauge sheet material suitably and attractively finished. In the mouth region of the figure of the dog's head as shown, is a loop aperture indicated at 13 for the reception of a metal ring or loop 14. The internal width of this loop, or the diameter of the ring if the loop be of circular form, preferably greatly exceeds the gauge of metal in the horizontal arm 12, from which it will appear, as best visualized from Fig. 2, that the ring may be swung laterally in either direction through a substantial angle, usually but without critical limitation, up to an angle of 60 degrees from a vertical line dropped from the aperture 13. Likewise it will appear from Fig. 1 that, due to the location of the aperture 13 close to the lower margin of the arm 12, and the provision of a cut away recess in plate arm 12 immediately adjacent each side of the aperture 13, a similar range of fore and aft movement of the loop 14 in aperture 13, and of the pendulum system supported from the loop, is possible.

It should be noted as highly desirable that when employing a sheet metal bracket such as 10—12, the horizontal supporting arm 12 lie in a vertical plane, although extended horizontally outwardly of the prime support, such as the wall W, extended upwardly from the floor F. In this manner the bracket 12 is of a high degree of vertical rigidity and is not flexed appreciably as otherwise might be the case, under conditions in which the entire weight of the animal during periods of swinging and playing, is imposed on the pendulum system to be described.

The loop 14 is connected at its lower extremity to a swivel connection 15, and the latter provided with a loop 16 which receives the upper tang or loop of an elongate coil-type metal tension spring 20. The spring 20 is by preference of a relatively somewhat lighter loading than many commercial springs of comparable size for other purposes, thus providing for a substantial degree of extension, preferably of the order of 50%–100% over initial length, without permanent set. Springs of these characteristics have been found to be highly attractive to most small dogs and other housefold pets, for the particular purposes of the present assembly.

Connected to the lower tang or loop of the spring 20, is a special eye element provided with a D shaped loop and indicated at 21, and extended through the element 21 is an adjustable length member generally indicated at 22.

Figure 3:
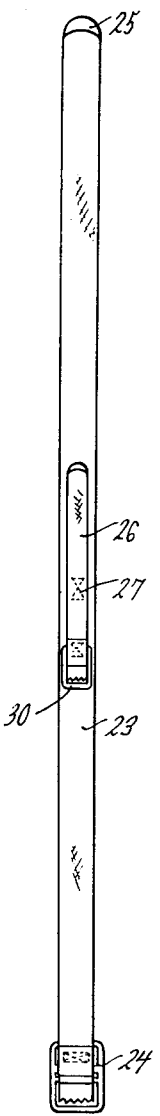
Fig. 3 is a plan view of one form of adjustable lure support and adjustable lure-gripping device attached thereto.

It has been found to prolong the period of maximum utility of the device when used by young dogs, to compensate for the growth, and hence the increasing height and reach of the dog. This is readily accomplished by reducing the length of member 22 as the animal advances in growth. It has been found that a sturdy form of canvas webbing in the form of a strip is very useful and enduring for this purpose. A length of such a strip material is indicated in Fig. 3 by the numeral 23, and is provided at one end with a buckle 24 which is or may be of a type conventional for use with such material. A metal clip 25 at the opposite end of the strip 23, prolongs the life thereof by reducing fraying tendencies. The buckle 24 is preferably of a type which permits an infinite degree of adjustment or takeup, and hence a nicety in variation of height of the lure L above the floor F.

Preferably secured between the buckle 24 and end 25 of the adjustable lure support 22, is a similar smaller element appearing in Fig. 3, and which may be referred to as a lure grip 26. This conveniently consists of a short strap or strip of a material similar to that constituting the adjustable support 23. To prevent loss and to assure an optimum location of the member 26, same is preferably stitched as at 27 to the strip 23. This lure-grip, located by numeral 26, is provided with a buckle or similar fastening 30 preferably of a type to enable an infinite adjustment in the size of the loop formed by member 26, so as to adapt same to the different shaping and dimensions of the different lures selected for best adaptability to different pets and animals of different ages.

Figure 2:
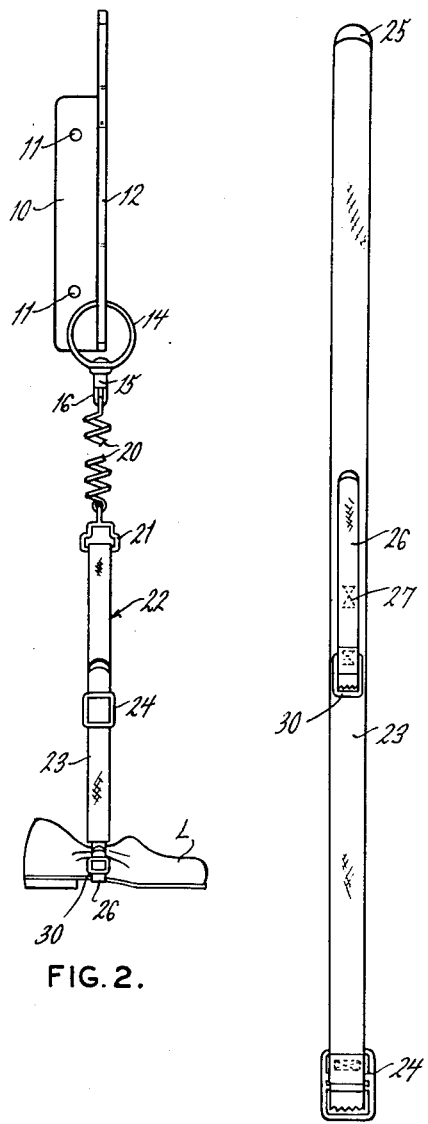
Fig. 2 is a front elevational view of the device somewhat fore-shortened, and with several of the parts considerably enlarged for clearness.

In Fig. 2 the lure L is indicated as a shoe, as an attractive object for dogs. It is of course contemplated that the element L may consist of a hollow device in which are located certain sound-producing objects such as are sometimes used in infant's rattles, and in floor toys for various pets. For cats the lure may, if desired, be so formed as to include catnip or some other attractive odor most appealing to a specific pet.

The function of the amusement device and exerciser as described, will for the most part have become obvious from the description of its parts and their individual purposes. It may be noted for completeness that it is advisable to install the device with the bracket 10—12 at such height that a given animal will be required to reach somewhat, or in some cases to jump slightly in grasping the lure L. An ultimate regulation of height of lure above the floor is achieved by varying the length of member 22 as described.

After a moderate period of experimentation with a given pet, his desires as to different types of lure can readily be ascertained. In some cases it has been found desirable to vary the lure L from time to time as a matter of maintenance of interest, particularly of young dogs. When thus selected, the lure L which may be, among others, an old shoe or slipper, a real or simulated bone, or a hollow object provided with internal sound effects, is appropriately balanced within the loop or bight formed by the member 26 and the buckle 30 thereof tightened about the object of interest L.

Due to the high degree of resilience of the spring 20, and its increasing load characteristic incident to extension, the greater the effort of the dog or other animal in tugging or pulling on the lure L, the greater the resistance encountered. This fact appeals to the combative and play instincts of the pet, and induces him to continue to tug and to increase his pull on the device. The degree of "give", and at the same time the inability to separate the lure from the remaining parts of the pendulum system, provide an incentive for exercise and play for protracted periods. The running, leaping, jumping and biting attacks on the lure result in beneficial exercise of most of the muscles of the body of the animal and at the same time a beneficial amusement therefor.

It has been found as a result of protracted experimental usage with a variety of pets, particularly dogs, that the device may be left installed indefinitely, and that, as adjudged by protracted periods of entirely voluntary entertainment and exercise of the pet, such benefits are of immeasurable benefit in preserving muscle tone, in the prevention of excess weight and as a source of psychological benefit due to the amusement factor.

Although the invention has been described by making detailed reference to a single currently preferred embodiment, the detail of description should be understood solely in an instructive, rather than in any limiting sense, numerous variants being possible within the fair scope of the claimed subject matter.

I claim as my invention:

In an amusement and self-exercising device for domestic pets, a supporting arm formed of right angularly connected sheet metal elements, one such element constituting a normally vertical mounting flange or plate apertured for the reception of wood screws or the like for mounting the plate, the plate being extended to form a horizontally extending arm, and provided with an aperture close to the lower margin of said plate, a metal ring extended through and freely swingable in said aperture, the plate being cut away in the region immediately adjacent each side of said aperture, whereby to permit a considerable range of fore and aft swingable movement of the ring in said aperture, a swivel connected to the ring, a metal coil-type tension spring of substantial length, having its upper end supportedly connected to the swivel, an adjustable member in the nature of a strap, supported from the lower end of the spring and including means providing for a substantial range of length adjustment of the lure supporting member, a lure-gripping member carried at the lower extremity of the lure-supporting member, said supporting member and gripping member being formed of a flexible, rugged, fabric webbing, the lure-supporting and -gripping members being independently adjustable, whereby to enable a variation in height of support of the lure, and an independent adjustment for lures of different sizes and proportions and hence of various degrees of attraction to different domestic pets.

References Cited in the file of this patent

UNITED STATES PATENTS

| Re. 11,665 | Sykes | May 17, 1898 |
| 170,845 | Fuller | Dec. 7, 1875 |
| 1,015,766 | Stone | Jan. 23, 1912 |
| 1,149,170 | Allis | Aug. 10, 1915 |
| 1,274,375 | Blows | Aug. 6, 1918 |
| 1,699,308 | Postings | Jan. 15, 1929 |
| 2,096,078 | Windson | Oct. 19, 1937 |
| 2,185,547 | Fowler | Jan. 2, 1940 |
| 2,194,736 | Bruler | Mar. 26, 1940 |
| 2,275,983 | Nadeau | Mar. 10, 1942 |
| 2,307,905 | Ament | Jan. 12, 1943 |
| 2,356,715 | Webster | Aug. 22, 1944 |

FOREIGN PATENTS

| 426,081 | Great Britain | Mar. 27, 1935 |